United States Patent [19]

Flament

[11] Patent Number: 5,269,483
[45] Date of Patent: Dec. 14, 1993

[54] CONTINUOUSLY ACTING ONE-WAY SATELLITE ROLL-YAW ATTITUDE CONTROL METHOD AND DEVICE

[75] Inventor: Patrick Flament, Le Cannet, France

[73] Assignee: Aerospatiale Societe Nationale Industrielle

[21] Appl. No.: 905,293

[22] Filed: Jun. 26, 1992

[30] Foreign Application Priority Data

Jul. 9, 1991 [FR] France ................. 91 08593

[51] Int. Cl.⁵ ............... B64G 1/26; B64G 1/28
[52] U.S. Cl. .................. 244/164; 244/165; 244/169
[58] Field of Search ............ 244/158 A, 164, 165, 244/166, 169, 170

[56] References Cited

U.S. PATENT DOCUMENTS

| | | | |
|---|---|---|---|
| 3,999,729 | 12/1976 | Muhlfelder et al. | 244/165 |
| 4,521,855 | 6/1985 | Lehner et al. | 244/164 |
| 4,949,922 | 8/1990 | Rosen | 244/164 |

FOREIGN PATENT DOCUMENTS

| | | |
|---|---|---|
| 0071445 | 2/1983 | European Pat. Off. |
| 0435708 | 7/1991 | European Pat. Off. |
| 2423808 | 11/1979 | France |
| 2434421 | 3/1980 | France |
| 2525359 | 10/1983 | France |

Primary Examiner—Galen Barefoot
Attorney, Agent, or Firm—Remy J. VanOphem

[57] ABSTRACT

Roll and yaw attitude control method for a satellite stabilized about its roll, yaw and pitch axes embodying a momentum wheel system generating a continuous angular momentum substantially parallel to the pitch axis and having a variable component at least approximately parallel to the roll-yaw plane and a continuously acting actuator system in which the roll and/or yaw attitude of the satellite is sensed. Control signals are applied to the momentum wheel system that are produced by a fast control loop using a known fast control law and second control signals are applied to the continuously acting actuator system that are produced by a slow control loop using a known slow control law. The continuously acting actuator system is loaded in fixed direction of the satellite parallel to the variable component if the latter has a fixed direction. At least a first additional control signal is applied to the momentum wheel system, chosen to yield a value of the fixed direction component of the angular momentum adapted to compensate in the long term drift of a second fixed direction component of the angular momentum. A second additional control signal is applied to the continuously acting actuator system that is adapted to cancel the effect of the first signal on the attitude with respect to the second fixed direction.

26 Claims, 11 Drawing Sheets

CONTINUOUSLY ACTING ONE-WAY SATELLITE ROLL-YAW ATTITUDE CONTROL METHOD AND DEVICE

BACKGROUND OF THE INVENTION

1. Field of the Invention

The invention concerns a device for roll-yaw attitude control of a satellite, usually a geostationary satellite, stabilized about three axes and having a continuous variable direction angular momentum.

In the present context a satellite is any artificial object in the solar system, being either in an orbit, circular or otherwise, about the Earth or any other planet or object in the solar system, or in a solar orbit, possibly a transfer orbit between two planets.

2. Description of the Prior Art

An orbiting satellite is known to be subject to disturbing torques with the following major causes:

asymmetrical effects of solar radiation pressure due to the angle of incidence of the pitch axis Y of the satellite relative to the Sun, the different reflectivity characteristics of the various parts of the satellite and the asymmetrical geometry of the satellite;

the action of the local (for example, terrestrial) magnetic field;

the effect of the local (for example, terrestrial) gravitational gradient (in the case of low orbits); and It is essential to provide means for controlling the attitude of the satellite in its orbit. Known means for achieving this include active means using (in the case of a satellite whose attitude is stabilized about three axes):

a plurality of momentum wheels;
and/or thrusters;
and/or the solar radiation pressure (acting on appropriately oriented mobile surfaces coupled to the satellite);
and/or the local (for example, terrestrial) magnetic field (by generating magnetic dipole current loops on board the satellite).

The present invention is more particularly concerned with the currently widely used concept of a satellite stabilized on three axes and having a variable direction angular momentum (generated in practice by momentum wheels). A satellite of this kind usually has an angular momentum whose main component is along the pitch axis so that the pointing of the satellite about this axis can be controlled by varying the angular momentum, which must be desaturated from time to time by external action. The angular momentum, whose major component is along the pitch axis, has at least one other variable component (secondary component) whereby it can be oriented in at least one other direction (usually transverse to the pitch axis) to enable control about at least one other axis transverse to the pitch axis. This is usually the yaw axis to enable control of pointing in roll. The usual function of such secondary components of the angular momentum is to damp nutation (and possibly flexible modes) to which the satellite may be subject and to control in the short term, as mentioned above, the angle of orientation of the satellite perpendicular to this component (usually the roll angle when the angular momentum enables control about the yaw axis).

Numerous articles and patents have already proposed to use control of the direction of the angular momentum of a satellite to control its attitude.

The below-listed references are particularly noteworthy.

French Patent 2,525,359: Method and device of controlling the attitude of an artificial terrestrial satellite;

European Patent 0,071,445: Electronic roll/yaw satellite control;

U.S. Pat. No. 4,294,420: Attitude control systems for space vehicles;

French Patent 2,550,757: Satellite position control;

German Patent 2,537,577: Lagerregelung fur Satelliten;

French Patent 2,530,046: Geosynchronous satellite attitude control method and device;

French patent application 89-15732: Satellite roll and yaw attitude control method;

French patent application 89-17479: Attitude control system for using solar panels for a satellite stabilized about three axes;

unpublished French patent application 90-16149: Attitude control system for three axis stabilized satellite;

Lacombe, J. L.: Magnetotorquing for the attitude control of geostationary satellite—article published in: Proceedings of AOCS conference held in Noordwijk, the Netherlands, 3-6 October 1977, ESA SP-128, November 1977, pp. 103-110;

Tsuchiya, K., Inoue, M., Wakasuqi, N. and Yamaguchi, T.: Advanced reaction wheel controller for attitude control of spacecraft—article published in: Acta Astronautica, Vol. 9, no 12, 1982, pp. 697—702; and Terasaki, R. M.: Dual reaction wheel control for spacecraft pointing—article published in: Proceedings of the symposium on attitude stabilization and control of dual spin spacecraft, Aerospace Corporation, El Segundo, California, August 1967.

When the satellite is in the mission normal mode (telecommunications or observation, for example, or scientific in nature), the objective of the attitude control system is to point the payload (antennas, optical instrument, radar, etc.) by maintaining the roll and yaw angles and drift thereof within assigned, possibly variable ranges.

To this end, appropriate control logic units simultaneously process sensor angular measurements and if necessary the speed of rotation of the wheels generating the angular momentum measured by tachometers and associated sensors in order to define set point angular momentum (or speeds) for these wheels and command torques for other actuators of the satellite.

In this type of attitude control, two control loops or logic units are typically used:

a fast loop whose objective is to reduce the roll and yaw angular speed and generally to provide short-term control of roll and/or yaw; attitude control can be effected by the wheels; this fast loop can be of any known type and does not form any part of the present invention; and a slow loop adapted to compensate the effects on the satellite attitude of external disturbing torques, representing longer term control, by commanding torques produced by the other actuators.

Known fast loops include those described in the aforementioned articles by Tsuchiya et al. and Terasaki.

Various types of slow loops are known, each type being usually adapted to suit the actuators and the measuring device with which the satellite is provided. One example is described in the aforementioned article by Lacombe.

An object of the invention is to achieve a high level of attitude pointing performance (in respect of accuracy and speed in particular), at least as good as with known solutions, minimizing the mass of the components required for such attitude pointing, their cost and their electrical power consumption, thereby making them simpler and more reliable.

To this end, the invention teaches the addition to the short-term control of angular momentum direction long-term control to minimize the torques required of the actuators controlling satellite attitude in the longer term. If these actuators are of the magnetic type, for example, and s the variable (or secondary) component of the angular momentum is in a fixed direction, their number may be reduced from two to one (with equivalent pointing performance), the one magnetic actuator being disposed to generate torque in the same direction as the secondary component of the angular momentum. The magnetic coil has two functions: not only long-term control of satellite attitude in roll but also maintaining a value of the secondary component of the angular momentum such that the rotation of the satellite in its orbit provides for long term control of the yaw angle.

It will be remembered that orbital rotation of a satellite interchanges the roll and yaw axes.

For example, an angular momentum in yaw becomes after one-quarter orbit an angular momentum in roll (assuming no disturbance and no active control). With respect to one point of the orbit, it can be said that the presence of the angular momentum in yaw causes a variation of the angular momentum in roll which is physically equivalent to a torque in roll. The invention proposes to use this torque to control the attitude of the satellite.

For equivalent performance, the invention can therefore minimize the cost, the mass, and the electrical power consumption of the attitude control system.

As already mentioned, many articles and patent specifications h proposed to use control of the direction of the angular momentum of the satellite for short-term attitude control. To the knowledge of the inventor, the only disclosure which considers adding control by the slow loop to angular momentum direction control by the fast loop is the inventor's own French patent application 89-15732. However, in this case the object is to temporarily store in the angular momentum a difference in the control torque due to a shortcoming of the continuous actuator employed. Thus no author has yet proposed to control the direction of the angular momentum in order to deliberately reduce the amplitude of the torque required of the continuous actuators.

To the contrary, the invention goes against the conventional wisdom in this art which is to avoid mixing short-term and long-term control on the same actuator.

SUMMARY OF THE INVENTION

In one aspect, the present invention is a roll and yaw attitude control method for a satellite stabilized about its roll, yaw and pitch axes. The invention embodies a momentum wheel system generating a continuous angular momentum substantially parallel to the pitch axis and having a variable component at least approximately parallel to the roll-yaw plane and a continuously acting actuator system, in which method the roll and/or yaw attitude of the satellite is sensed, command signals are applied to the momentum wheel system that are produced by a fast control loop using a known fast control law and second command signals are applied to the continuously acting actuator system that are produced by a slow control loop using a known slow control law. According to the method of the present invention, the continuously acting actuator system is loaded in a fixed direction of the satellite parallel to the variable component if the latter has a fixed direction, at least a first additional control signal is applied to the momentum wheel system that is chosen to yield a value of the fixed direction component of the angular momentum adapted to compensate in the long term drift of a second fixed direction component of the angular momentum, and a second additional control signal is applied to the continuously acting actuator system that is adapted to cancel the effect of the first signal on the attitude with respect to the second fixed direction.

According to optionally combinable preferred features of this method:

the first fixed direction is parallel to the yaw axis and the second fixed direction is parallel to the roll axis;

the variable component of the angular momentum is at all times exclusively parallel to the first fixed direction;

the variable component of the angular momentum is variable in direction in the roll/yaw plane;

the continuously acting actuator system is a magnetic system interacting with the local magnetic field;

the satellite is in a geosynchronous orbit inclined at less than 10°;

the first additional control signal is adapted to cause the wheel system to generate a torque in the form:

$$T_w = (H_c - H_m) \cdot K_w$$

where:

$H_m$ = instantaneous measured value of the yaw component, $K_w$ = transfer function, possibly just a gain, $H_c$ = set point value of the yaw component adapted to compensate in the long term drift in roll of the angular momentum, where $$H_c = \frac{T_{xc}}{\omega_o}$$

where:

$T_{xc}$ = roll command torque produced by a conventional slow loop, $\omega_o$ = local speed of orbital rotation.

In preferred applications of the invention, in a first case, the first fixed direction is parallel to the yaw axis and the second fixed direction is parallel to the roll axis and the first and second additional control signals are adapted to cause the momentum wheel system and the continuously acting actuator system to generate torques in the form:

$$T_w = \left( -H_{ym} * \psi * K_{mx} - \frac{TD_x}{\omega_o} - H_{zm} \right) * K_w \quad (7)$$

$$T_{zc} = K_{mz} * \omega_o * H_{ym} * \phi - TD_z + T_w \quad (8)$$

$T_w$ being chosen so that $|T_{zc}| < T_{avail}$ where:

$T_{avail}$ = maximum torque that the actuator can provide about the Z axis (assumed here to be the same in both directions),
$T_{zc}$ = Z axis actuator command torque,
$H_{ym}$, $H_{zm}$ = measured momentum wheel Y and Z axis angular momentum components,
$T_w$ = momentum wheel Z axis angular momentum component command torque,
$\phi$ = measured roll angle,
$\psi$ = measured yaw angle,
$\omega_o$ = local angular speed of orbital rotation,
$TD_x, TD_z$ = estimated disturbing torques about the X and Z axes,
$K_{mx}$, $K_{mz}$, $K_w$ = transfer functions, possibly just gains.

In a second case, the first fixed direction is parallel to the yaw axis and the second fixed direction is parallel to the roll axis and the first and second additional control signals are adapted to cause the momentum wheel system and continuously acting actuator system to generate torques of the form:

$$T_w = -\left(K_{mz} * H_{ym} * \phi + \frac{H_{zm} - H_{zr}}{\omega_o}\right) * \sin\alpha_w * K_w \quad (9)$$

$$T_{zc} = (K_{mz} * \omega_o * H_{ym} * \phi + H_{zm} - H_{zr}) * \cos\alpha_w + T_w \quad (10)$$

$$H_{zr} = T_w * dt \quad (11)$$

$T_w$ being chosen so that $|T_{zc}| < T_{avail}$
where:
$\alpha_w$ = WHECON angle between 5° and 85°,
$T_{avail}$ = maximum torque that the actuator can generate about the X axis,
$T_{zc}$ = actuator command torque about the X axis,
$H_{ym}$, $H_{zm}$ = measured momentum wheel Y and Z axis angular momentum components,
$T_w$ = momentum wheel Z axis angular momentum component command torque,
$\phi$ = measured roll angle,
$\psi$ = measured yaw angle,
$\omega_o$ = local angular speed of orbital rotation,
$TD_x$, $TD_z$ = estimated disturbing torques about the X and Z axes,
$K_{mz}$, $K_{wz}$ = transfer functions, possibly just gains.

In a third case, the first fixed direction is parallel to the yaw axis and the second fixed direction is parallel to the roll axis and the first and second additional control signals are adapted to cause the momentum wheel system and the continuously acting actuator system to generate torques of the form:

$$T_{wx} = \omega_o * (K_{mx} * H_{ym} * \psi + H_{zm}) + TD_x \quad (12)$$

$$T_{wz} = \left(-\frac{TD_x}{\omega_o} - H_{zm}\right) * K_{wz} \quad (13)$$

$$T_{zc} = \omega_o * (K_{zm} * H_{ym} * \phi + H_{xm}) - TD_z + T_{wz} \quad (14)$$

$T_{wz}$ being chosen so that $|T_{zc}| < T_{avail}$
where:
$T_{avail}$ = maximum torque that the actuator can provide,
$T_{zc}$ = actuator command torque,
$H_{xm}$, $H_{ym}$, $H_{zm}$ = measured momentum wheel X, Y and Z axis angular momentum components, $T_{wx}$, $T_{wz}$ = momentum wheel X and Z axis angular momentum component command torques,
$\phi$ = measured roll angle,
$\psi$ = measured yaw angle,
$\omega$ = local angular speed of orbital rotation,
$TD_x$, $TD_z$ = estimated disturbing torques about the X and Z axes,
$K_{mx}$, $K_{mz}$, $K_{wz}$ = transfer functions, possibly just gains.

A second embodiment of the invention is a device for controlling the roll/yaw attitude of a satellite stabilized about its roll, yaw and pitch axes embodying a momentum wheel system generating a continuous angular momentum substantially parallel to the pitch axis and having a variable component at least approximately parallel to the roll-yaw plane and a continuously acting actuator system including a set of sensors for detecting the roll or yaw attitude of the satellite, first means for applying to the momentum wheel system command signals produced by a fast control loop according to a known fast control law and second means for applying to the continuously acting actuator system second command signals produced by a slow control loop using a known slow control law. The continuously acting actuator system is active in a fixed direction of the satellite parallel to the variable component if the latter is fixed in direction, the slow control loop is connected to the momentum wheel system via the fast control loop and applies to the momentum wheel system at least one additional command signal so that the fixed direction component of the angular momentum assumes a value adapted to compensate in the long term drift of a second fixed direction angular momentum component, and the second means applies to the continuously acting actuator system a second additional command signal adapted to cancel the effect of the first signal on the satellite with respect to the second fixed direction.

According to preferred features of the second embodiment the first fixed direction is parallel to the yaw axis and the second fixed direction is parallel to the roll axis.

The variable component of the angular momentum is at all times exclusively parallel to the first fixed direction.

The momentum wheel system embodies an inertia wheel whose axis is at least approximately parallel to the pitch axis and a reaction wheel whose axis is parallel to the first fixed direction.

The momentum wheel system embodies two inertia wheels disposed in a V arrangement with their axes in the plane of the pitch axis and the first fixed direction at least approximately symmetrical relative to the pitch axis.

The momentum wheel system embodies an inertia wheel mounted on a single pivot whose axis is perpendicular to the first fixed direction.

The variable component of the angular momentum is variable in direction in the roll/yaw plane.

The momentum wheel system embodies an inertia wheel whose axis is mounted on a double pivot.

The continuously acting actuator system is a magnetic system interacting with the local magnetic field.

The satellite is in a geosynchronous orbit inclined at less than 10°.

The orbit is a geostationary orbit.

The first additional command signal is adapted to cause the momentum wheel system to generate a torque of the form:

$$T_w = (H_c - H_m) \cdot K_w$$

where:
- $H_m$ = instantaneous measured value of the yaw component,
- $K_w$ = transfer function, possibly just a gain,
- $H_c$ = set point value of the yaw component adapted to compensate in the long term drift in roll of the angular momentum, where $$H_c = \frac{T_{xc}}{\omega_0}$$

where:
- $T_{xc}$ = roll command torque produced by a conventional slow loop,
- $\omega_0$ = local speed of orbital rotation.

In a first case, the first fixed direction is parallel to the yaw axis and the second fixed direction is parallel to the roll axis and the first and second additional control signals are adapted to cause the momentum wheel system and the continuously acting actuator system to generate torques in the form:

$$T_w = \left( -H_{ym} \cdot \psi \cdot K_{mx} - \frac{TD_x}{\omega_0} - H_{zm} \right) \cdot K_w \quad (7)$$

$$T_{zc} = K_{mz} \cdot \omega_0 \cdot H_{ym} \cdot \phi - TD_z + T_w \quad (8)$$

$T_w$ being chosen so that $|T_{zc}| < T_{avail}$
where:
- $T_{avail}$ = maximum torque that the actuator can provide about the Z axis (assumed here to be the same in both directions),
- $T_{zc}$ = Z axis actuator command torque,
- $H_{ym}$, $H_{zm}$ = measured momentum wheel Y and Z axis angular momentum components,
- $T_w$ = momentum wheel Z axis angular momentum component command torque,
- $\phi$ = measured roll angle,
- $\psi$ = measured yaw angle,
- $\omega_0$ = local angular speed of orbital rotation,
- $TD_x$, $TD_z$ = estimated disturbing torques about the X and Z axes,
- $K_{mx}$, $K_{mz}$, $K_w$ = transfer functions, possibly just gains.

In a second case, the first fixed direction is parallel to the yaw axis and the second fixed direction is parallel to the roll axis and the first and second additional control signals are adapted to cause the momentum wheel system and continuously acting actuator system to generate torques of the form:

$$T_w = -\left( K_{mz} \cdot H_{ym} \cdot \phi + \frac{H_{zm} - H_{zr}}{\omega_0} \right) \cdot \sin a_w \cdot K_w \quad (9)$$

$$T_{zc} = (K_{mz} \cdot \omega_0 \cdot H_{ym} \cdot \phi + H_{zm} - H_{zr}) \cdot \cos a_w + T_w \quad (10)$$

$$H_{zr} = \int T_w \cdot dt$$

$T_w$ being chosen so that $|T_{zc}| < T_{avail}$ where:
- $a_w$ = WHECON angle between 5° and 85°,
- $T_{avail}$ = maximum torque that the actuator can generate about the X axis,
- $T_{zc}$ = actuator command torque about the X axis,
- $H_{ym}$, $H_{zm}$ = measured momentum wheel Y and Z axis angular momentum components,
- $T_w$ = momentum wheel Z axis angular momentum component command torque,
- $\phi$ = measured roll angle,
- $\psi$ = measured yaw angle,
- $\omega_0$ = local angular speed of orbital rotation,
- $TD_x$, $TD_z$ = estimated disturbing torques about the X and Z axes,
- $K_{mz}$, $K_{wz}$ = transfer functions, possibly just gains.

In a third case, the first fixed direction is parallel to the y axis and the second fixed direction is parallel to the roll axis and the first and second additional control signals are adapted to cause the momentum wheel system and the continuously acting actuator system to generate torques of the form:

$$T_{wx} = \omega_0 \cdot (K_{mx} \cdot H_{ym} \cdot \psi + H_{zm}) + TD_x \quad (12)$$

$$T_{wz} = \left( -\frac{TD_x}{\omega_0} - H_{zm} \right) \cdot K_{wz} \quad (13)$$

$$T_{zc} = \omega_0 \cdot (K_{zm} \cdot H_{ym} \cdot \phi + H_{xm}) - TD_z + T_{wz} \quad (14)$$

$T_w$ being chosen so that $|T_{zc}| < T_{avail}$
where:
- $T_{avail}$ = maximum torque that the actuator can provide,
- $T_{zc}$ = actuator command torque,
- $H_{xm}$, $H_{ym}$, $H_{zm}$ = momentum wheel X, Y and Z axis angular momentum components,
- $T_{wx}$, $T_{wz}$ = momentum wheel X and Z axis angular momentum component command torque,
- $\phi$ = measured roll angle,
- $\psi$ = measured yaw angle,
- $\omega_0$ = local angular speed of orbital rotation,
- $TD_x$, $TD_z$ = estimated disturbing torques about the X and Z axes,
- $K_{mx}$, $K_{mz}$, $K_{wz}$ = transfer functions, possibly just gains.

Objects, features and advantages of the invention will emerge from the following description given by way of non-limiting example with reference to the appended drawings.

DETAILED DESCRIPTION OF THE PREFERRED EMBODIMENT

Figure 1:
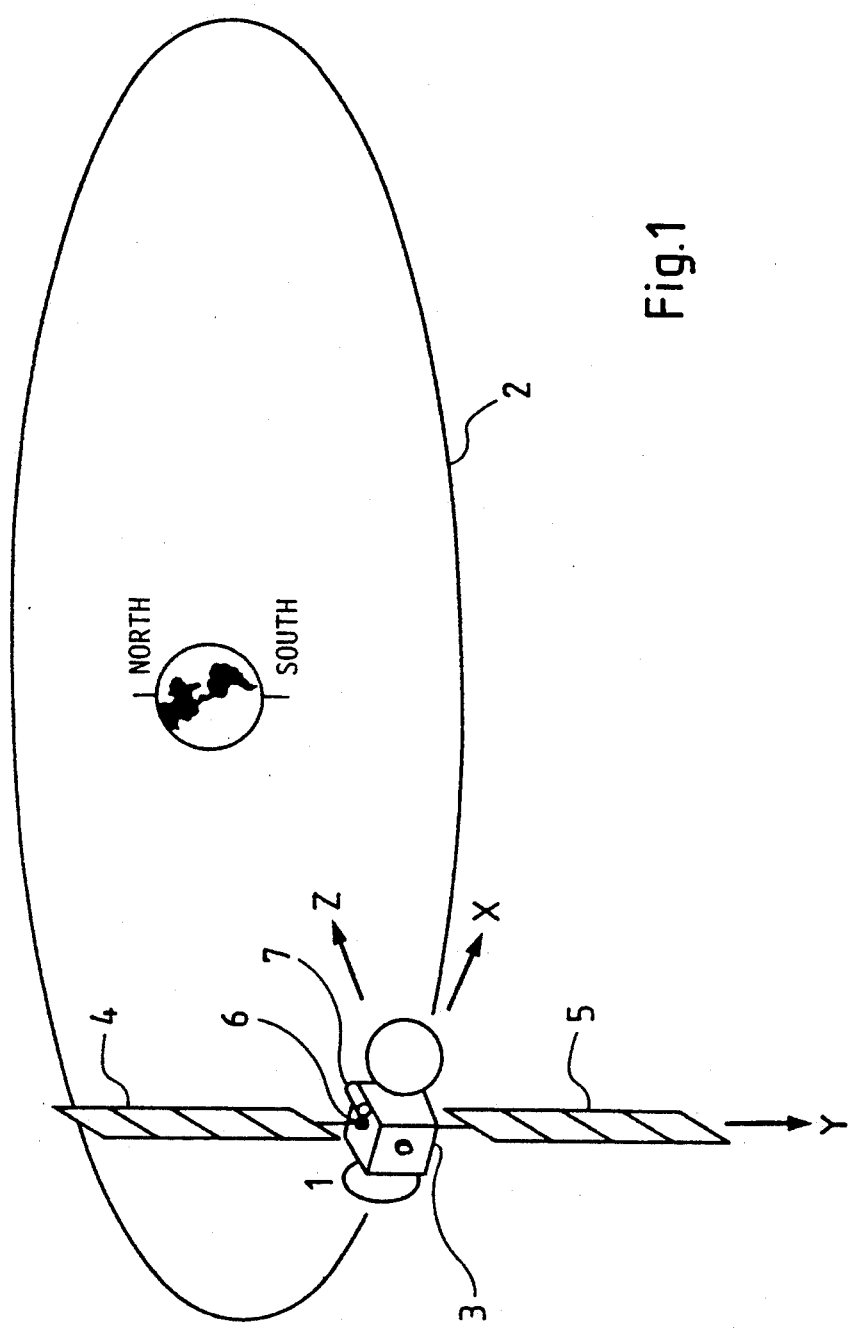
FIG. 1 is a diagrammatic view of a spacecraft stabilized about three axes orbiting around the Earth.

FIG. 1 shows a satellite 1 in circular orbit 2 about the Earth.

The satellite has a central body 3, substantially a cube in this example, with which are associated three axes defining a trihedral direct frame of reference related to the satellite:

an X axis tangential to the orbit 2 and in the same direction as the orbital velocity; this is conventionally call the roll axis;

a Y axis perpendicular to the plane of the orbit 2 and oriented in the North-south direction of the Earth; this is conventionally called the pitch axis; and a Z axis perpendicular to the X and Y axes and oriented towards the Earth; this is conventionally called the yaw axis.

In some satellites this frame of reference is oriented differently relative to the orbit and/or the Earth depending on mission-related constraints.

The satellite incorporates an attitude control device (see below) which stabilizes it about its three axes.

The satellite incorporates a conventional attitude measurement device, the output signals from which are processed conventionally to calculate attitude corrections to be applied to the satellite. This device usually includes an Earth sensor 7 (of the infrared type, for example) usually adapted to measure the attitude in roll and in pitch. It can equally well include sun or even star sensors, pointing towards the Pole star, for example, to measure the attitude in yaw, in particular, if necessary. The remainder of the attitude control device, which is in itself conventional, is not shown in FIG. 1 to make the figure clearer.

The satellite may include two solar arrays 4 and 5 which can be oriented by motors 6 and which can in some cases be used as attitude control actuators. In an alternative arrangement that is not shown, the satellite incorporates an internal power source, a nuclear device, for example, in which case the solar arrays may be eliminated. In other cases a single solar array may be sufficient.

The satellite also incorporates various other conventional equipments (antennas, etc.) and actuators (thrusters, etc.) which are not described in detail here as they are not directly relevant to the invention.

The satellite has any appropriate known type of angular momentum generator system. The main component of the angular momentum is parallel to the pitch axis and at least one other component is of variable amplitude within the frame of reference of the satellite.

Figure 2:
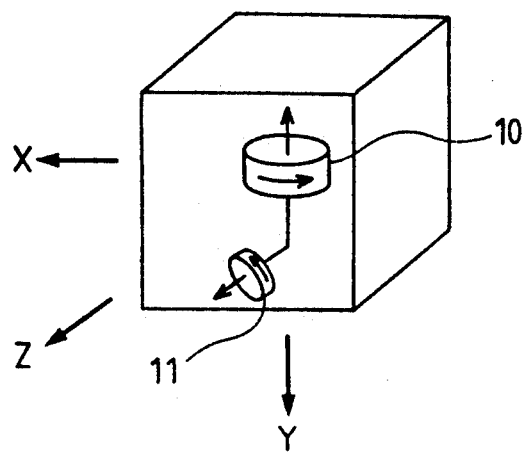
FIGS. 2, 3 and 4 show momentum wheel arrangements routinely employed to obtain a pitch axis angular momentum of which another component (in yaw in this example) has a variable amplitude (and a fixed direction relative to the satellite)
Figure 3:
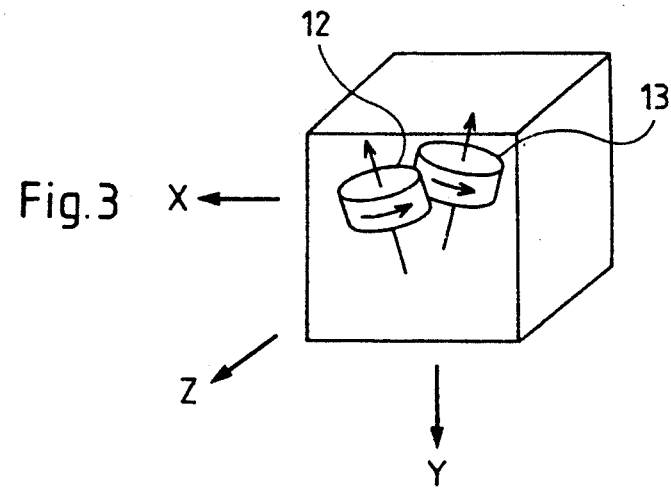
Figure 4:
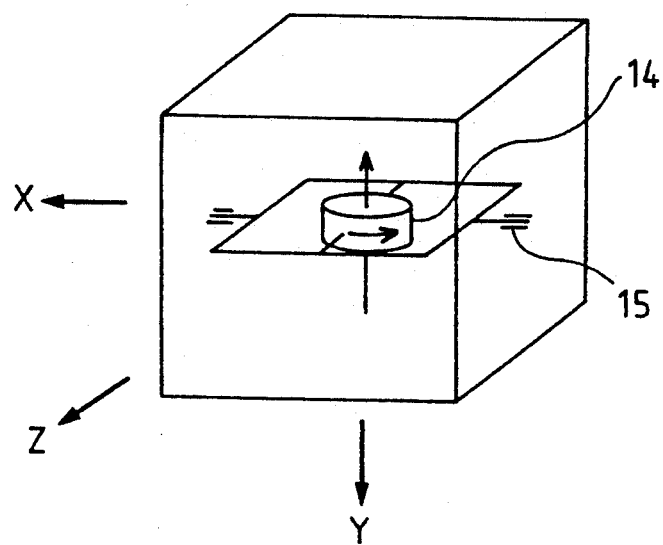

An angular momentum generator system means a set of components of the satellite rotated at variable speed by motors. These members are referred to hereinafter as inertia wheels, if the resulting moment always has the same sign, or reaction wheels if the resultant moment can have either sign. The component referred to as a "wheel" may be a part of the satellite having other functions than generating an angular momentum (in the case of a dual-spin two-part satellite, for example). A yaw axis angular momentum whose direction can be varied with one degree of freedom may be generated as follows, for example:

using an inertia wheel 10 whose axis is at least approximately parallel to the pitch axis and a reaction wheel 11 whose axis is along the yaw axis (see FIG. 2);

or using two inertia wheels 12 and 13 in a V-shape arrangement with their axes symmetrical to the pitch axis (see FIG. 3) in the plane defined by the pitch and yaw axes;

or using a single inertia wheel 14 mounted on a pivot having an axis 15 parallel to the roll axis (see FIG. 4).

Figure 5:
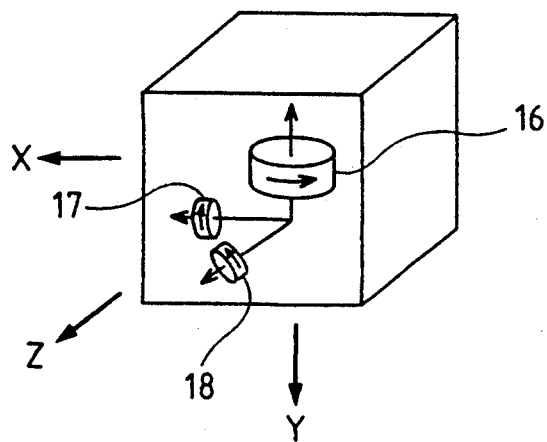
FIGS. 5 and 6 show momentum wheel arrangements routinely employed to obtain a pitch axis angular momentum of which two other components, in roll and in yaw in this example, are variable.
Figure 6:
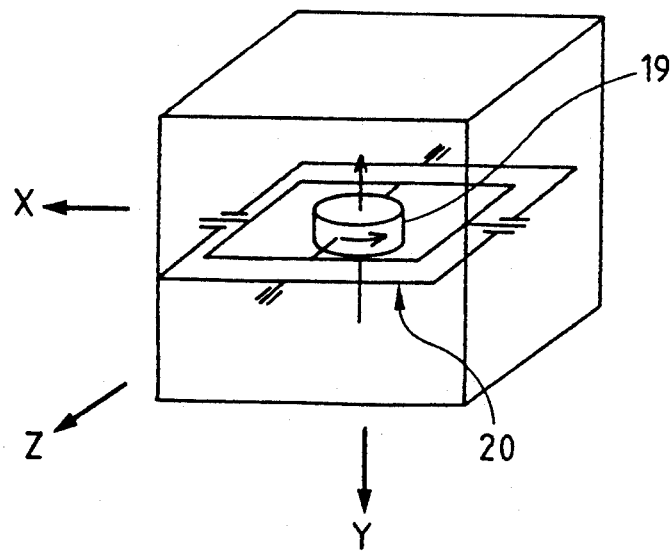

An angular momentum whose direction can be varied with two degrees of freedom may be generated as follows, for example:

using an inertia wheel 16 whose axis is parallel to the pitch axis and two reaction wheels 17 and 18 in the roll/yaw plane, in this example with axes along the roll and yaw axes respectively (see FIG. 5);

or using a single inertia wheel 19 whose axis is mounted on a double pivot 20 in the roll/yaw plane (see FIG. 6).

The satellite is also provided with at least one continuous actuator adapted to generate torques in a direction close to the roll/yaw plane and at least approximately parallel to the secondary component of the angular momentum, if there is only one such component.

The continuous actuator may be, for example:

of the magnetic coil type, with or without a core, or of the type using solar radiation pressure on surfaces coupled to the satellite.

The novelty of the invention resides in the hitherto unused idea of superimposing on short-term control of angular momentum direction long-term control with the object of controlling the direction of the angular momentum in such a way that it reduces or even eliminates the torque required of the continuous actuators other than the momentum wheels.

It will be remembered that orbital rotation of a satellite interchanges the roll and yaw axes.

For example, an angular momentum in yaw becomes after one-quarter orbit an angular momentum in roll (assuming no disturbance and no active control). With respect to one point of the orbit, it can be said that the presence of the angular momentum in yaw causes a variation of the angular momentum in roll which is physically equivalent to a torque in roll. The invention proposes to use this torque to control the attitude of the satellite.

Figure 7:
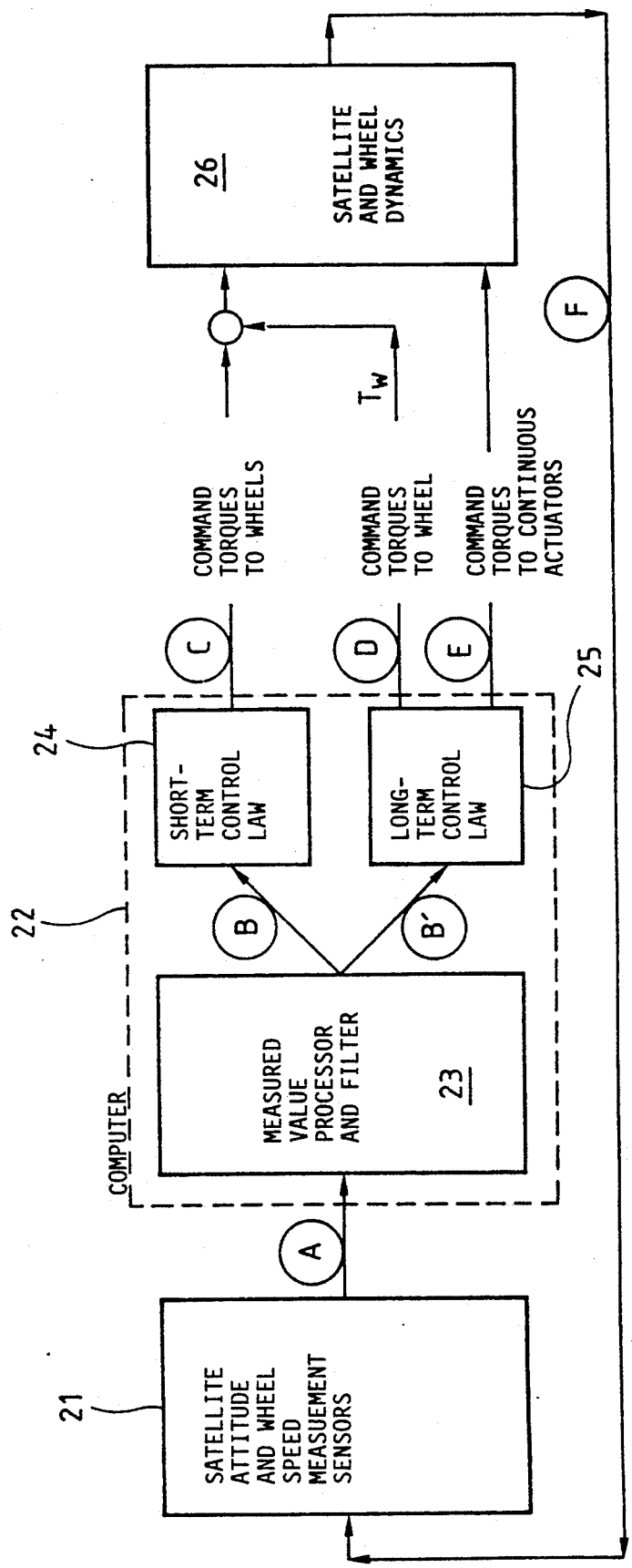
FIG. 7 is a simplified flowchart of the roll/yaw control system of a satellite using the invention.

This is shown in FIG. 7 in which the block 21 represents all of the sensors with which the attitude control system is provided in order to be able to sense the attitude of the body 3, the speed of the momentum wheels and where applicable the speed of rotation of the body 3 about its axes. The data from the sensors, represented by the arrow A, is passed to a computer 22 which processes the data. The processor may include, for example, a processor and filter stage 23 of any appropriate known type to eliminate measurement noise and/or to estimate disturbing torques, to estimate the rotation speed of the satellite and/or to estimate attitude errors which have not been measured. The processed data B and B' is then passed to:

short-term control logic 24 known in itself responsible for computing command torques C to be generated by the momentum wheels (or the coils or the solar panels) with the object of damping nutation (and possibly flexible modes) to which the satellite may be subject and controlling satellite attitude in the short term (in roll in the case of a Z axis angular momentum);

long-term control logic 25 responsible for computing:

in accordance with the invention, command torques D to be generated by the momentum wheels (even if the actuators of the loop are different) wit the object of varying the direction of the angular momentum of the satellite in accordance with the principle of the invention; these torques will be added to those generated by the short-term control logic C; and command torques E to be generated by the other continuous actuators of the satellite with the object of controlling the satellite attitude in the long term and compensating the torques D that will be generated by the momentum wheels for long-term control of the angular momentum.

These torques are then applied to the satellite which reacts according to the known laws of dynamics, which modifies its attitude. This is represented by the block 26. The arrow F denotes the resulting attitude and angular speed of the satellite which will be measured by the sensors of the block 21.

The remainder of the description discloses how the invention achieves active control of roll and yaw movement of a satellite stabilized about three axes by momentum wheels and at least one other known type actuator (a magnetic actuator in the examples considered here). Pitch control will not be described in detail as it does not form any part of this invention; for example, it is achieved by means of inertia wheel(s) and known desaturation actuators such as thrusters or any other known means.

The long-term (scalar) equations of satellite behavior (ignoring accelerations processed by the fast loop) can be linearized to the small angles of roll/yaw movement of the satellite (negligible terms have been omitted):

$$H_x - (I_x * \omega_o + H_y) * \psi - \omega_o * H_z = T_{xc} + TD_x \qquad (1)$$

$$H_z + (I_z * \omega_o + H_y) * \phi + \omega_o * H_x = T_{zc} + TD_z \qquad (2)$$

where:

$I_x, I_z$ = main moments of inertia of the satellite about the X and Z axes, $T_{xc}, T_{zc}$ = command torques applied by the continuous actuators about the X and Z axes, $H_x, H_y, H_z$ = components along the X, Y or Z axis of the angular momentum of the momentum wheels, $H_x, H_z$ = derivatives of the components along the X and Z axes of the angular momentum of the momentum wheels, $\phi$ = roll angle and speed, $\psi, \psi$ = yaw angle and speed, $\omega_o$ = local angular speed of orbital rotation, $TD_x, TD_z$ = disturbing torques about the X and Z axes.

The angular momentum is controlled in accordance with the invention by the application to the momentum wheels of command torques $T_w$ which are added to the torques commanded by the fast loop, these command torques being compensated by opposite command torques from the continuous actuators. Examination of the satellite roll/yaw movement in equations (1) and (2) shows that:

action on $H_z$, included in the term $\omega_o * H_z$, behaves like a command torque $T_{xc}$;

similarly, the term $\omega_o * H_x$ behaves like a command torque $T_{zc}$, so that by operating on $H_z$ it is possible to minimize $T_{xc}$ or by operating on $H_x$ it is possible to minimize $T_{zc}$;

on the other hand, the terms $H_x$ and $H_z$ can be compensated by respective command torques $T_{xc}$ and $T_{zc}$.

It is therefore possible, for example, to dispense with application of one of the command torques ($T_{xc}$, for example) and therefore to eliminate the associated actuator, provided that the other command torque $T_{zc}$ is chosen to yield a value of the term $\omega_o * H_z$ such that the control loop concludes that a null value of the X axis torque $T_{xc}$ is required.

The remainder of the structure of the slow loop (that is to say the laws determining the command torques about each axis) may be of any known type, which means that the present invention can be implemented on any satellite which has a variable direction angular momentum. This can even be achieved on satellites already in orbit by downloading modified onboard software or by control from the ground (for example, for a satellite with continuous actuators in two directions, of which one has failed).

The control law for the secondary components of the angular momentum may, in accordance with the invention, be chosen as of the following type for each active axis:

$$T_w = H = (H_c - H_m) * K_w$$

$T_w$ being reduced if necessary so that it lies within the range $[T_c - T_{avail}, T_{avail} - T_c]$ to prevent the command torque exceeding the capacity of the continuous actuator associated with this axis, where:

$T_w$ = command torque to the momentum wheel motor about the axis in question, $T_{avail}$ = maximum torque that the continuous actuator can produce about the axis in question, $T_c$ = command torque to the continuous actuator about the axis in question, as determined by the conventional laws chosen, to eliminate the need for the "other" command torque, $H_c, H_m$ = commanded (see above) and measured components of the angular momentum of the momentum wheels about the axis in question, $K_w$ = transfer function (possibly just a gain) chosen beforehand to achieve a sufficiently fast response but not so fast as to saturate the continuous actuator responsible for opposing this torque, H = derivative of the component of the angular momentum of the momentum wheels about the axis in question.

Figure 7A:
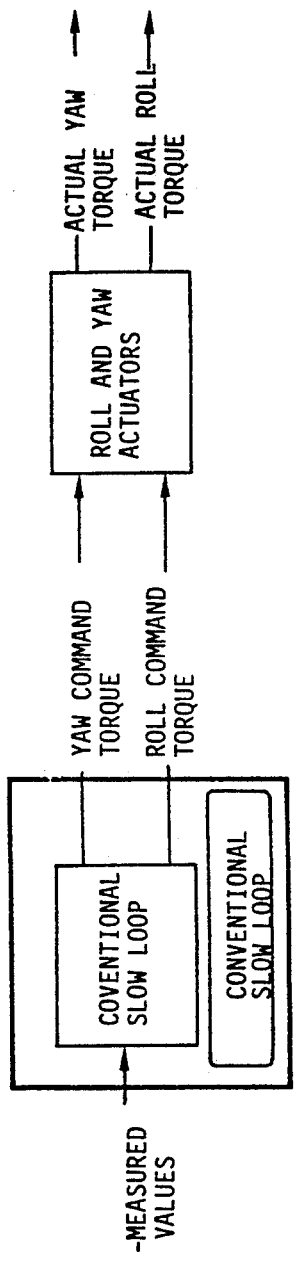
FIG. 7A is a simplified flowchart summarizing the conventional stages of roll/yaw control on the basis of a conventional slow loop.
Figure 7B:
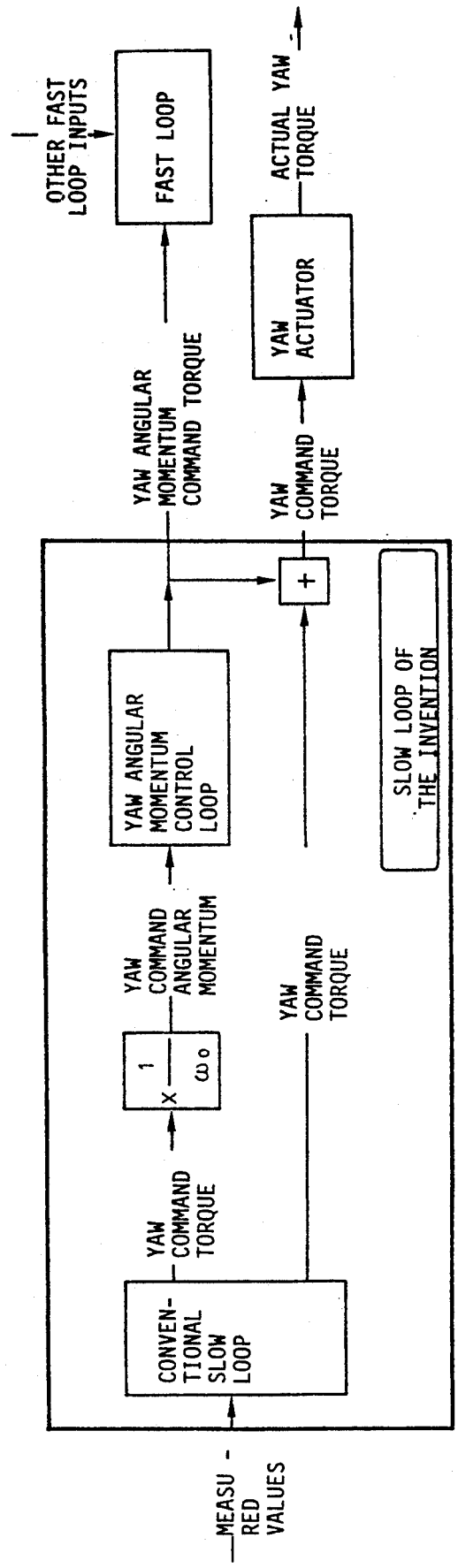
FIG. 7B is a simplified flowchart summarizing the roll/yaw control stages proposed by the invention (see FIG. 7) on the basis of the conventional slow loop from FIG. 7A.

FIGS. 7A and 7B clearly illustrate the contribution of the invention.

Conventionally, the slow loop generates torques to be applied in roll and in yaw simultaneously. The invention as shown in FIG. 7B proposes not to apply the roll torque, replacing it by an equivalent angular momentum in yaw, for example. The principle of roll control is therefore replaced by slaving the angular momentum in yaw to the value:

$$H_c = \frac{T_{xc}}{\omega_o}$$

where:

$T_{xc}$=roll command torque required by a conventional slow loop,
$\omega_o$=local speed of orbital rotation,
$H_c$=set point value of yaw angular momentum.

The torques to be applied to the momentum wheels having been defined in this way with respect to a frame of reference (axes) tied to the satellite, it remains only to project them (in the known manner) onto the axes of the momentum wheels and/or their pivot to deduce therefrom the command signals to be applied directly to the momentum wheel motors as appropriate to the nature and the disposition of the momentum wheels.

In practice the logic defining these loops is implemented onboard the satellite, for example by a computer using constant or variable gain and scale factors programmed into an associated memory unit. Another option would be to process the measurements from the sensors and to command the actuators from the ground.

As already stated, to our knowledge the invention is the first proposal of a method for three-axis stabilized satellites exploiting secondary components of the angular momentum for long-term satellite attitude control. By virtue of this technique, and for the same performance in pointing, the invention makes it possible to reduce the number of actuators onboard, their mass and the torque that they must generate as compared with prior art solutions. With a variable direction angular momentum satellite, the invention is particularly well suited to the requirements for pointing future optical telecommunication satellites and second generation direct TV broadcast satellites.

FIGS. 8 through 13 show various possible applications of the invention.

In a first application (FIGS. 8 and 9) the satellite has an angular momentum variable in direction about only the yaw axis and carries a magnetic control device adapted to generate command torques about the yaw axis. The roll and pitch angles are measured by the Earth sensor ST and the Pole star sensor SP measures the roll and yaw angles. The satellite also has thrusters of which three thrusters T1, T2, and T3 are shown. These thrusters, required for other modes of attitude control, will be used as back-up in the event of any fierce magnetic storms disturbing the magnetic field to the point where the coil is rendered inoperative. The variable direction angular momentum is produced by two inertia wheels RC disposed in a "V" arrangement. A reaction wheel RR can compensate for failure of one inertia wheel. The magnetic coil BM is oriented along the X axis and therefore produces command torques about the Z axis.

Figure 8:
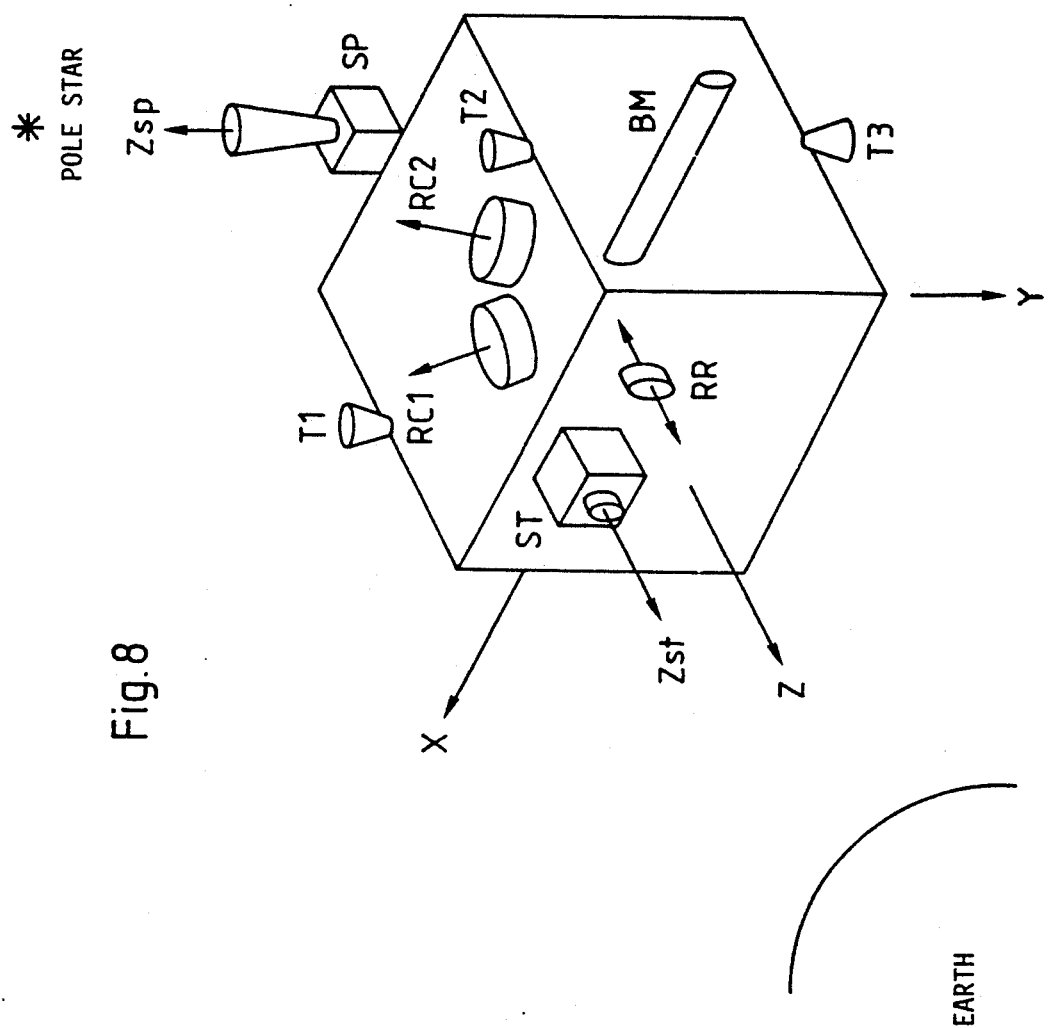
FIG. 8 is a diagrammatic perspective view of a satellite having an angular momentum variable in direction about the yaw axis and a magnetic actuator acting along the yaw axis.

By application of the present invention, this arrangement shown in FIG. 8 enables continuous control about the roll/yaw axes and high pointing performance (identical to that of the unpublished French patent application 90 169149 which uses two coils). The advantage of the invention in this case is that it requires only one coil instead of two as in the prior art solutions, approximately halving the mass and the energy consumption of the actuators.

Figure 9:
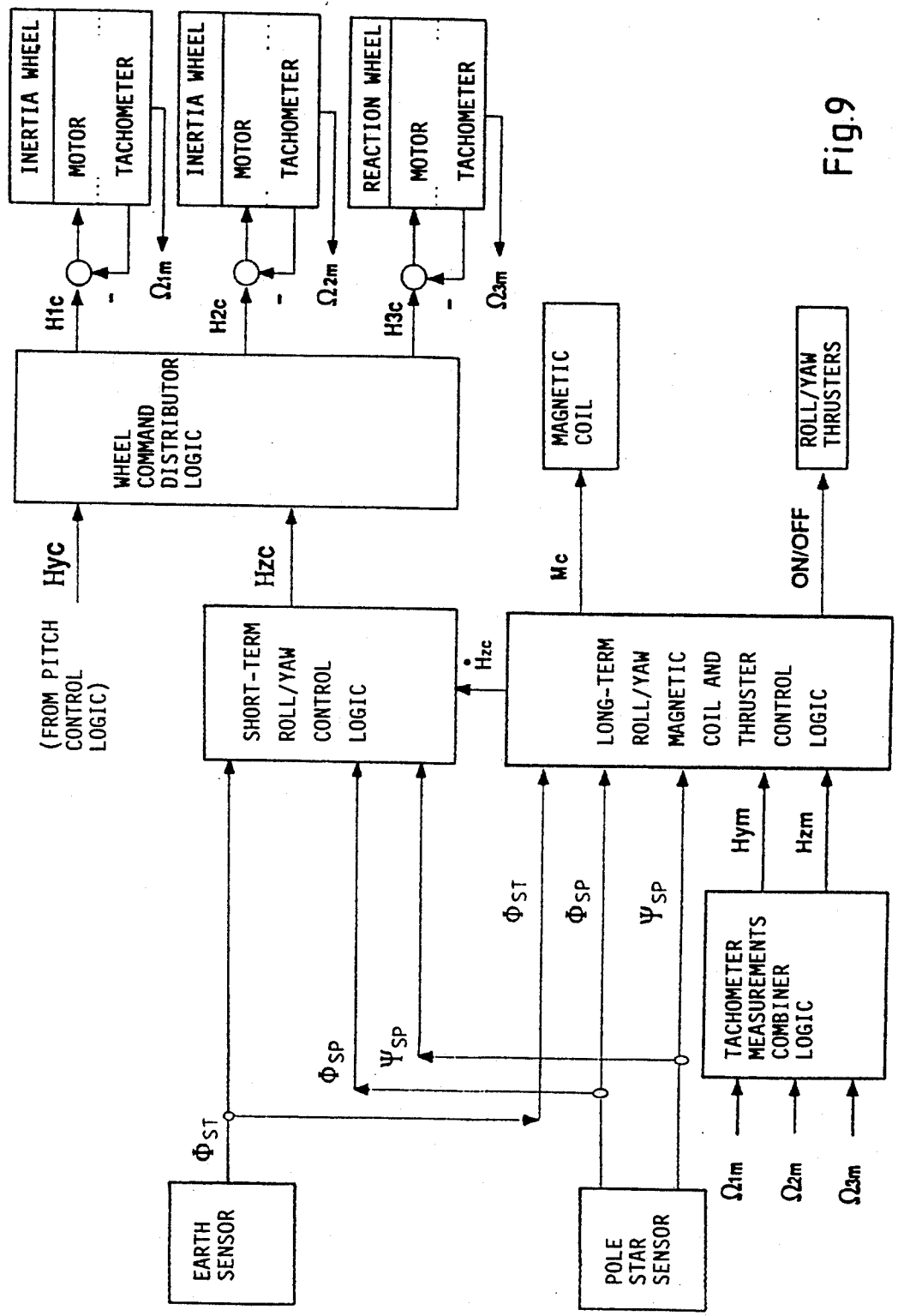
FIG. 9 is a block diagram of the attitude control device of the satellite from FIG. 8.
Figure 10:
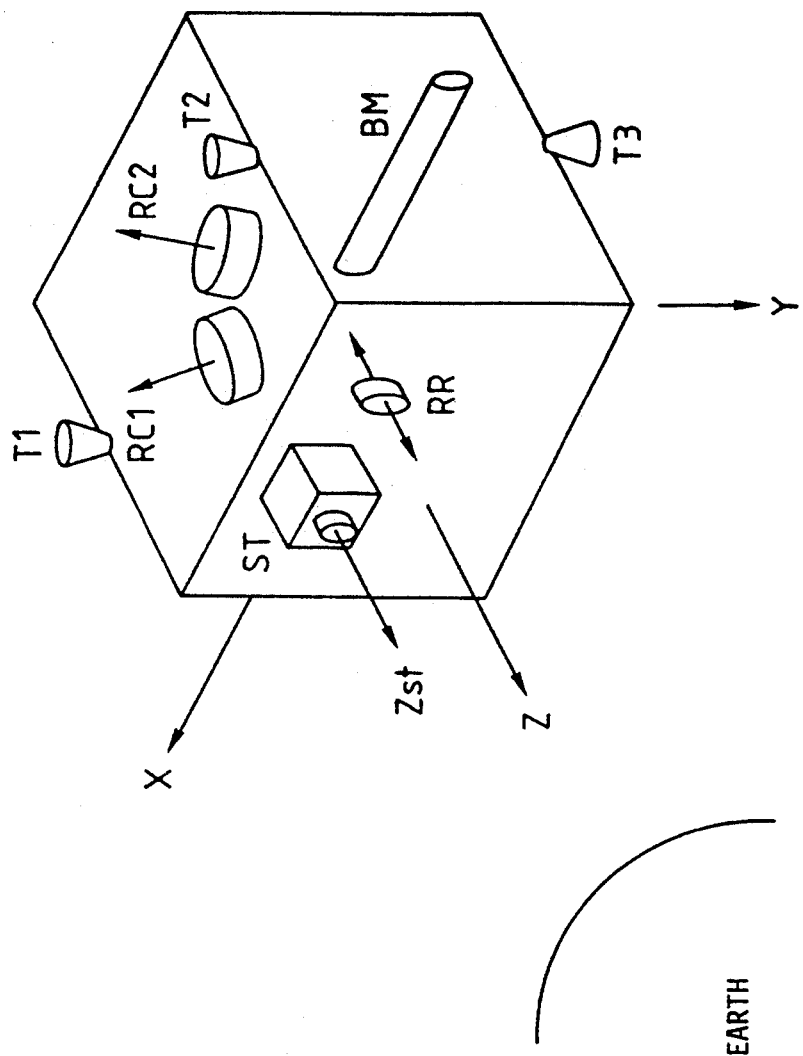
FIG. 10 is a diagrammatic perspective view of a satellite similar to that in FIG. 8 but having no star sensor.

The FIG. 9 flowchart shows the control logic.

The roll and yaw measurement $\phi_{sp}$ and $\psi_{sp}$ from the Pole Star sensor and the roll measurement $\phi_{st}$ from the Earth sensor are passed to the short-term and long-term control logic. The wheel speeds $\Omega_{1m}$, $\Omega_{2m}$, and $\Omega_{3m}$ measured by the tachometers are combined by tachometer measurements combiner logic which computes the angular momentum $H_{ym}$ and $H_{zm}$ as measured about the Y and Z axes which are transmitted to the long-term control logic which determines and commands:

the magnetic dipole $M_c$ which the coil must generate to supply the required torque $T_{zc}$;
activation of the thrusters, if necessary (magnetic storm); and
the long-term torque $H_{zc}$ or $T_w$ which the momentum wheels must provide and which is communicated to the short-term logic.

The short-term logic determines the command angular momentum $H_{zc}$ about the Z axis (generated by the pitch control logic). From this are computed the command angular momentum $H_{1c}$, $H_{2c}$ and $H_{3c}$ for the three momentum wheels. This uses the control loop of each momentum wheel incorporating a motor and a tachometer for each momentum wheel.

The long-term control laws for the momentum wheels and for the continuous actuator are of the following form, for example:

$$T_w = \left(-H_{ym} * \psi * K_{mx} - \frac{TD_x}{\omega_o} - H_{zm}\right) * K_w \quad (7)$$

$$T_{zc} = K_{mz} * \omega_o * H_{ym} * \phi - TD_z + T_w \quad (8)$$

$T_w$ being chosen so that $|T_{zc}| < T_{avail}$
where:

$T_{avail}$=maximum torque that the actuator can provide about the Z axis (assumed here to be the same in both directions),
$T_{zc}$=command torque to the Z axis actuator,
$H_{ym}$, $H_{zm}$=measured Y and Z axis components of the angular momentum of the momentum wheels,
$T_w$=command torque for the Z axis component of the angular momentum of the momentum wheels,
$\phi$=measured roll angle, =measured yaw angle,
$\omega_o$=local angular speed of orbital rotation,
$TD_x$, $TD_z$=estimated disturbing torques about the X and Z axes,
$K_{mx}$, $K_{mz}$, $K_w$=transfer functions, possibly just gains.

In a second application, the configuration of the satellite (shown in FIG. 10) is identical to the previous one except that the Pole star sensor has been eliminated. Application of the invention yields performance comparable to that of the system described in the aforementioned article by Lacombe, which discloses a design method for a magnetic roll/yaw control system for a three-axis stabilized geosynchronous satellite with two momentum wheels in a V configuration and proposes to generate the magnetic dipole onboard according to a law based on the conventional WHECON type control used for thrusters on current satellites such as ECS, TDF/TVSAT, EUTELSAT. To this end the axis of the coil is offset relative to the yaw axis by an angle $\alpha$ near 45° and the modulus of the magnetic dipole is defined according to the roll angle measured by an Earth sensor.

The advantage of the present invention is then that the dipole required is reduced 25% relative to the Lacombe system with a commensurate saving in the mass and the energy consumption of the coil. Also, installation of the coil in the satellite will be facilitated by its orientation along a geometrical axis of the satellite rather than at 45° as in the Lacombe system. Finally, the WHECON angle $a_w$ is replaced in accordance with the invention with a purely numeric parameter which can be optimized in time according to predicted disturbing torques or even disturbing torques measured in flight, whereas the orientation of the Lacombe coil fixes it once and for all.

Application of the invention also provides for performance comparable with that of the device described in the aforementioned European patent 0,071,445 which proposes a device in which a magnetic coil is used to generate a torque about the X axis orthogonal to the Z axis angular momentum secondary component. As compared with European patent 0,071,455, the advantage of the present invention is that it continuously controls the secondary component of the angular momentum which will remain at all times in a limited range unlike European patent 0,071,445 in which the Z axis component of the angular momentum is controlled passively by orbital coupling and tends to diverge if a constant disturbing torque about the Z axis is applied to the satellite. This divergence will lead to the use of thrusters to reduce the Z axis angular momentum, consuming propellant and therefore representing an additional mass penalty.

The reader is reminded that because of orbital rotation a yaw pointing error is converted (in the absence of disturbances and positive control) into a roll pointing error. Thus on many satellites yaw is not measured directly by an appropriate sensor and yaw control is effected passively on the basis of the roll measurement which includes in part the effect of yaw pointing errors. This principle is widely used and is known as WHECON (a contraction of WHEel CONtrol, referring to the pitch axis angular momentum). This amounts to applying to the satellite roll and yaw torques in a proportional ratio. The tangent of this ratio is called the WHECON angle and is a physical representation of the direction of the roll/yaw control actuator torque. The second application indicated here therefore proposes a control law derived from the WHECON principle except that the WHECON angle becomes a parameter with no physical counterpart and which can be adapted as necessary.

Figure 11:
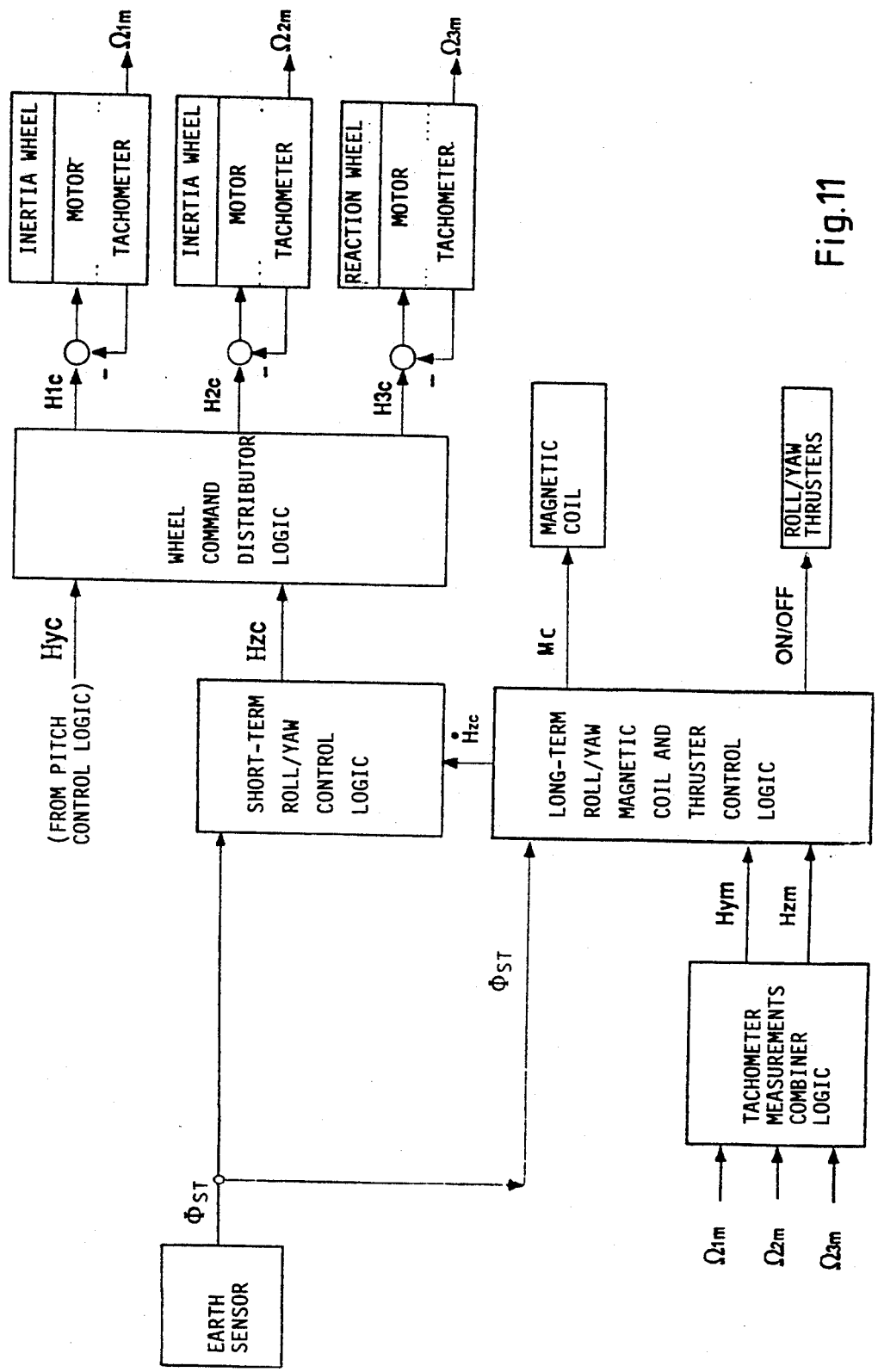
FIG. 11 is a block diagram of the attitude control device of the satellite from FIG. 10.

The control logic represented by the FIG. 11 flowchart is similar to the previous one. The difference is that the long-term control laws do not require any measurement of yaw.

The control laws are of the following form, for example:

$$T_w = -\left(K_{mz} * H_{ym} * \phi + \frac{H_{zm} - H_{zr}}{\omega_o}\right) * \sin a_w * K_w \quad (9)$$

$$T_{zc} = (K_{mz} * \omega_o * H_{ym} * \phi + H_{zm} - H_{zr}) * \cos a_w + T_w \quad (10)$$

$$H_{zr} = \int T_w * dt \quad (11)$$

$T_w$ being chosen so that $|T_{zc}| < T_{avail}$ where:
$a_w$=WHECON angle between 5° and 85°, $T_{avail}$=maximum torque that the actuator can generate about the X axis,
$T_{zc}$=command torque to the actuator about the X axis,
$H_{ym}$, $H_{zm}$=measured momentum wheel Y and Z axis angular momentum components,
$T_w$=momentum wheel Z axis angular momentum component command torque,
$\phi$=measured roll angle,
$\psi$=measured yaw angle,
$\omega_o$=local angular speed of orbital rotation,
$TD_x$, $TD_z$=estimated disturbing torques about X and Z axes,
$K_{mz}$, $K_{wz}$=transfer functions, possibly just gains.

In a third application, the configuration of the satellite (shown in FIG. 12) is identical to that of the first application (FIG. 8) except that the angular momentum direction is variable with two degrees of freedom. The angular momentum is obtained by means of a momentum wheel whose axis is mounted on a double pivot.

Figure 12:
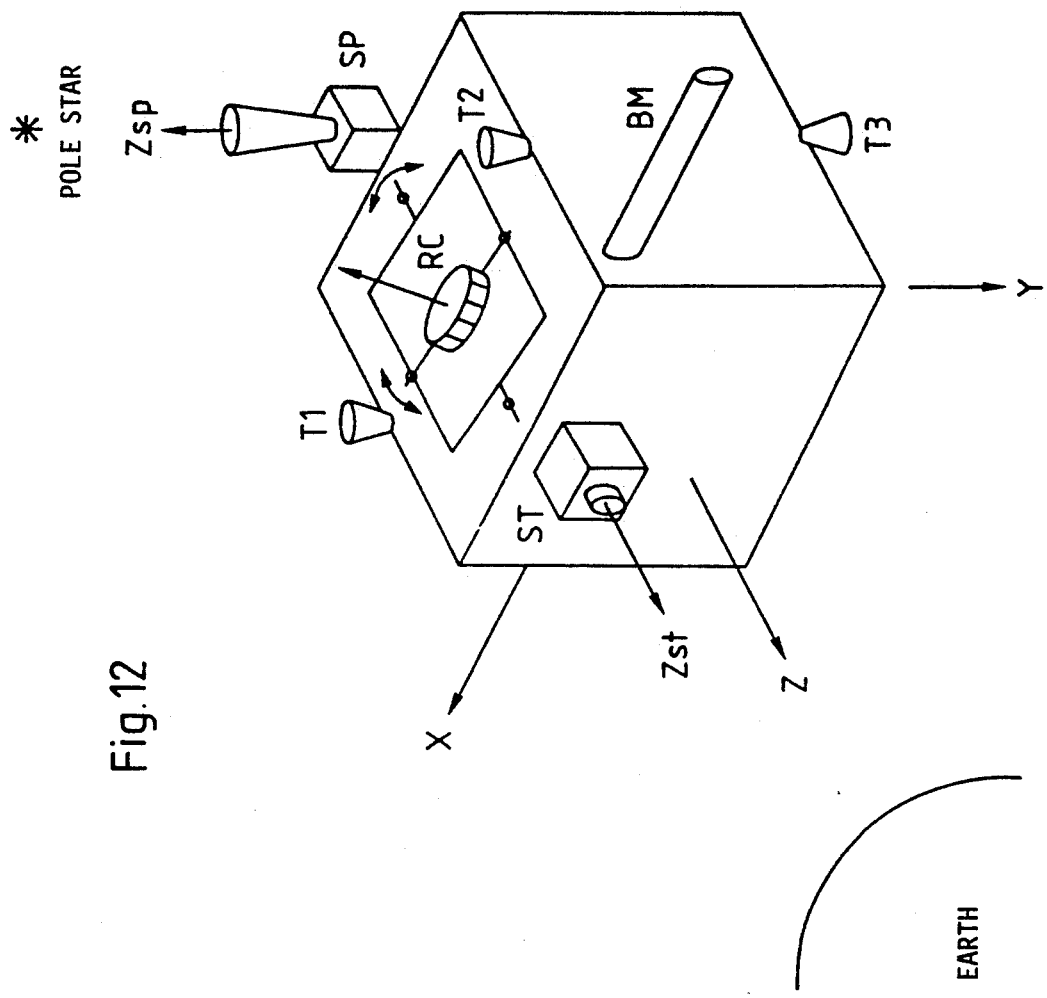
FIG. 12 is a diagrammatic perspective view of a satellite similar to that from FIG. 8 but having an angular momentum variable in direction about the roll and yaw axes.

By application of the present invention, the arrangement shown in FIG. 12 enables continuous control about the roll/yaw axes and pointing performance comparable with that of a satellite having two coils generating torques about the X and Z axes.

In this case the advantage of the invention is that it requires only one coil rather than two, halving the mass and the energy consumption of the actuators (the reduction may be slightly less than half because the dipole required from the coil may be slightly greater).

Figure 13:
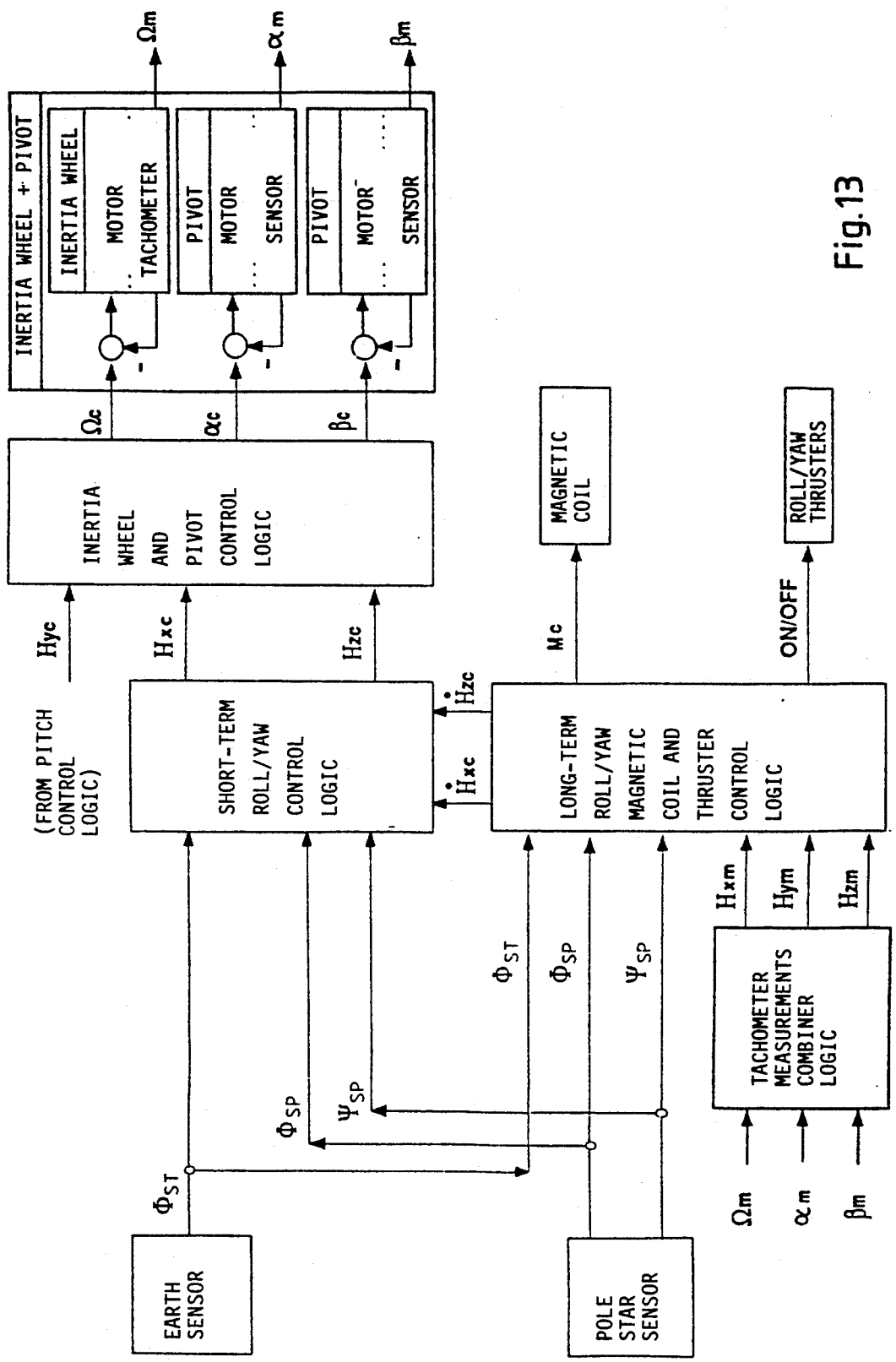
FIG. 13 is a block diagram of the attitude control device of the satellite from FIG. 12.

The control logic represented by the FIG. 13 flowchart is similar to that of the first application. The differences concern:

the momentum wheel and the control of the angular momentum by the speed of the wheel and the angles of inclination of the pivots;

the fact that the short-term control law also generates an X axis command angular momentum $H_{xc}$, and the fact that the long-term control law also generates an X axis command torque $H_{xc}$ and $T_{wx}$.

In this case the control laws can be of the following form:

$$T_{wx} = \omega_o * (K_{mx} * H_{ym} *_o + H_{zm}) + TD_x \quad (12)$$

$$T_{wz} = \left(-\frac{TD_x}{\omega_o} - H_{zm}\right) * K_{wz} \quad (13)$$

$$T_{zc} = {}_o * (K_{zm} * H_{ym} *_o + H_{xm}) - TD_z + T_{wz} \quad (14)$$

$T_{wz}$ being chosen so that $|T_{zc}| < T_{avail}$
where:

$T_{avail}$=maximum torque that the actuator can provide,
$T_{zc}$=actuator command torque,
$H_{xm}$, $H_{ym}$, $H_{zm}$=measured momentum wheel X, Y and Z axis angular momentum components,
$T_{wx}$, $T_{wz}$=momentum wheel X and Z axis angular momentum component command torques,
$\phi$=measured roll angle,
$\psi$=measured yaw angle,
$\omega$=local angular speed of orbital rotation,
$TD_x$, $TD_z$=estimated disturbing torques about the X and Z axes,
$K_{mx}$, $K_{mz}$, $K_{wz}$=transfer functions, possibly just gains.

It goes without saying that the foregoing description has been given by way of non-limiting example only and that numerous variants may be proposed by one skilled in the art without departing from the scope of the invention.

Thus the axes of the momentum wheels and the actuators may be on axes other than the roll and yaw axes, which modifies the form of the control laws without modifying their principle.

The measurement sensors may be replaced by any other sensor or combination of sensors producing comparable data; for example, the yaw measurement can be deduced from the measurement of a star sensor aimed at a star other than the Pole star (CANOPUS, for example) or a sun sensor.

Continuous actuators other than magnetic actuators could be considered, for example, thrusters or photonic devices, aerodynamic type actuators, or actuators using the local (for example terrestrial) gravitational gradient.

There is claimed:

1. In a method of roll and yaw attitude control for controlling the attitude of a satellite stabilized about roll, yaw and pitch axes, wherein a single direction continuously acting actuator system generates torques along a first satellite fixed direction and a momentum wheel system generates continuously non-null angular momentum having a major torque component parallel to said pitch axis and at least one variable torque component parallel to said first satellite fixed direction, the improvement of said attitude control method comprising the steps of:

sensing a roll and/or yaw attitude condition;

sensing a wheel speed condition from said momentum wheel system;

generating from said sensed attitude condition a first wheel torque control signal along at least said first satellite fixed direction for short-term compensation of attitude errors;

calculating from said sensed attitude condition and said sensed wheel speed condition a reference value for at least one variable component of said angular momentum for long-term compensation of a drift of said angular momentum along a second satellite fixed direction;

generating a first additional wheel torque control signal along at least said first satellite fixed direction for long-term compensation of the error between the instant value of said at least one variable component of said angular momentum parallel to said first satellite fixed direction and said reference value;

generating from said sensed attitude condition and from said sensed wheel speed condition second wheel torque control signals along said first satellite fixed direction for long term compensation of attitude errors and disturbing torques;

generating second additional wheel torque control signals along said first satellite fixed direction for compensation of the effect of said first additional torque control signals on satellite attitude along said second satellite fixed direction;

generating first control commands from said first wheel torque control signals and said first additional wheel torque control signals and applying said first control commands to said momentum wheel system; and generating second control commands from said second wheel torque control signals and said second additional wheel torque control signals and applying said second control commands to said single direction continuously acting actuator system.

2. Method according to claim 1 wherein said first satellite fixed direction is parallel to said yaw axis and said second satellite fixed direction is parallel to said roll axis.

3. Method according to claim 2 wherein said first additional wheel torque control signal is adapted to cause said momentum wheel system to generate a torque in the form:

$$T_w = (H_c - H_m) \cdot K_w$$

where:

$H_m$ = instantaneous measured value of the yaw component, $K_w$ = transfer function, possibly just a gain, $H_c$ = set point value of the yaw component adapted to compensate in the long term drift in roll of the angular momentum, where $$H_c = \omega_0 T_{xc}$$

where:

$T_{xc}$ = roll command torque produced by a conventional slow loop, $\omega_0$ = local speed of orbital rotation.

4. Method according to claim 1 wherein said variable component of said angular momentum is at all times parallel to said first satellite fixed direction.

5. Method according to claim 4 wherein said first satellite fixed direction is parallel to said yaw axis, said second satellite fixed direction is parallel to said roll axis and said first and second additional wheel torque control signals are adapted to cause said momentum wheel system and said continuously acting actuator system to generate torques in the form:

$$T_w = \left( -H_{ym} * \psi * K_{mx} - \frac{TD_x}{\omega_0} - H_{zm} \right) * K_w \quad (7)$$

$$T_{zc} = K_{mz} * \omega_0 * H_{ym} * \phi - TD_z + T_w \quad (8)$$

$T_w$ being chosen so that $|T_{zc}| < T_{avail}$ where:

$T_{avail}$ = maximum torque that the actuator can provide about the Z axis (assumed here to be the same in both directions), $T_{zc}$ = Z axis actuator command torque, $H_{ym}$, $H_{zm}$ = measured momentum wheel Y and Z axis angular momentum components, $T_w$ = momentum wheel Z axis angular momentum component command torque, $\phi$ = measured roll angle, $\psi$ = measured yaw angle, $\omega_0$ = local angular speed of orbital rotation, $TD_x$, $TD_z$ = estimated disturbing torques about the X and Z axes, $K_{mx}$, $K_{mz}$, $K_w$ = transfer functions, possibly just gains.

6. Method according to claim 4 wherein said first satellite fixed direction is parallel to said yaw axis, said second satellite fixed direction is parallel to said roll axis and said first and second additional control signals are adapted to cause said momentum wheel system and said single direction continuously acting actuator system to generate torques of the form:

$$T_w = -\left(K_{mz} * H_{ym} * \phi + \frac{H_{zm} - H_{zr}}{\omega_o}\right) * \sin\alpha_w * K_w \quad (9)$$

$$T_{zc} = (K_{mz} * \omega_o * H_{ym} * \phi + H_{zm} - H_{zr}) * \cos\alpha_w + T_w \quad (10)$$

$$H_{zr} = \int T_w * dt \quad (11)$$

$T_w$ being chosen so that $|T_{zc}| < T_{avail}$
where:

$\alpha_w$ = WHECON angle between 5° and 85°, $T_{avail}$ = maximum torque that the actuator can generate about the X axis, $T_{zc}$ = actuator command torque about the X axis, $H_{ym}$, $H_{zm}$ = measured momentum wheel Y and Z axis angular momentum components, $T_w$ = momentum wheel Z axis angular momentum component command torque, $\phi$ = measured roll angle, $\psi$ = measured yaw angle, $\omega_0$ = local angular speed of orbital rotation, $TD_x$, $TD_z$ = estimated disturbing torques about the X and Z axes, $K_{mz}$, $K_{wz}$ = transfer functions, possibly just gains.

7. Method according to claim 1 wherein said variable type component of said angular momentum is variable in direction in the roll/yaw plane.

8. Method according to claim 7 wherein said first satellite fixed direction is parallel to said yaw axis, said second satellite fixed direction is parallel to said roll axis and said first and second additional wheel torque control signals are adapted to cause said momentum wheel system and said single direction continuously acting actuator system to generate torques of the form:

$$T_{wx} = \omega_o * (K_{mx} * H_{ym} * \psi + H_{zm}) + TD_x \quad (12)$$

$$T_{wz} = \left(-\frac{TD_x}{\omega_o} - H_{zm}\right) * K_{wz} \quad (13)$$

$$T_{zc} = \omega_o * (K_{zm} * H_{ym} * \phi + H_{xm}) - TD_z + T_{wz} \quad (14)$$

$T_{wz}$ being chosen so that $|T_{zc}| < T_{avail}$
where:

$T_{avail}$ = maximum torque that the actuator can provide, $T_{zc}$ = actuator command torque, $H_{xm}$, $H_{ym}$, $H_{zm}$ = measured momentum wheel X, Y and Z axis angular momentum components, $T_{wx}$, $T_{wz}$ = momentum wheel X and Z axis angular momentum component command torques, $\phi$ = measured roll angle, $\psi$ = measured yaw angle, $\omega_0$ = local angular speed of orbital rotation, $TD_x$, $TD_z$ = estimated disturbing torques about the X and Z axes, $K_{mx}$, $K_{mz}$, $K_{wz}$ = transfer functions, possibly just gains.

9. Method according to claim 1 wherein said single direction continuously acting actuator system is a magnetic system interacting with the local magnetic field.

10. Method according to claim 1 wherein said satellite is in a geosynchronous orbit inclined at less than 10°.

11. Method according to claim 10 wherein said orbit is a geostationary orbit.

12. In combination with a roll and yaw attitude control for controlling the attitude of a satellite stabilized about roll, yaw and pitch axes, of the type wherein a single direction continuously acting actuator system generates torques along a first satellite fixed direction and a momentum wheel system generates continuously non-null angular momentum having a major torque component parallel to said pitch axis and at least one variable torque component parallel to said first satellite fixed direction, the improvement of said attitude control comprising:

means for sensing a roll and/or yaw attitude condition;

means for sensing a wheel speed condition from said momentum wheel system;

means for generating from said sensed attitude condition a first wheel torque control signal along at least said first satellite fixed direction for short-term compensation of attitude errors;

means for calculating from said sensed attitude condition and said sensed wheel speed condition a reference value for at least one variable component of said angular momentum for long-term compensation of a drift of said angular momentum along a second satellite fixed direction;

means for generating a first additional wheel torque control signal along at least said first satellite fixed direction for long-term compensation of the error between the instant value of said at least one variable component of said angular momentum parallel to said first satellite fixed direction and said reference value;

means for generating from said sensed attitude condition and from said sensed wheel speed condition second wheel torque control signals along said first satellite fixed direction for long term compensation of attitude errors and disturbing torques;

means for generating a second additional wheel torque control signal along said first satellite fixed direction for compensation of the effect of said first additional torque control signal on satellite attitude along said second satellite fixed direction;

means for generating first control commands from said first wheel torque control signal and said first additional wheel torque control signal and applying said first control commands to said momentum wheel system; and means for generating second control commands from said second wheel torque control signal and said second additional wheel torque control signal and applying said second control commands to said single direction continuously acting actuator system.

13. The combination as claimed in claim 12 wherein said first satellite fixed direction is parallel to said yaw axis and said second satellite fixed direction is parallel to said roll axis.

14. The combination as claimed in claim 12 wherein said first additional wheel torque control signal is adapted to cause said momentum wheel system to generate a torque of the form:

$$T_w = (H_c - H_m) \cdot K_w$$

where:

$H_m$ = instantaneous measured value of the yaw component, $K_w$ = transfer function, possibly just a gain, $H_c$ = set point value of the yaw component adapted to compensate in the long term drift in roll of the angular momentum, where $$H_c = {}_{107_0}{}^{T_{xc}}$$

where:
$T_{xc}$ = roll command torque produced by a conventional slow loop,
$\omega_o$ = local speed of orbital rotation.

15. The combination as claimed in claim 12 wherein said variable component of said angular momentum is at all times parallel to said first fixed direction.

16. The combination as claimed in claim 15 wherein said momentum wheel system comprises an inertia wheel having an axis approximately parallel to said pitch axis and a reaction wheel having an axle parallel to said first fixed direction.

17. The combination as claimed in claim 15 wherein said momentum wheel system comprises two inertia wheels disposed in a V arrangement having their respective axes in the plane of said pitch axis and said first satellite fixed direction, said two inertia wheels being spaced approximately symmetrical relative to said pitch axis.

18. The combination as claimed in claim 15 wherein said momentum wheel system comprises an inertia wheel mounted on a single pivot having an axis perpendicular to said first satellite fixed direction.

19. The combination as claimed in claim 12 wherein said first satellite fixed direction is parallel to said yaw axis, said second satellite fixed direction is parallel to said roll axis and said first and second additional control signals are adapted to cause said momentum wheel system and said single direction continuously acting actuator system to generate torques in the form:

$$T_w = \left( -H_{ym} * \psi * K_{mx} - \frac{TD_x}{\omega_o} - H_{zm} \right) * K_w \quad (7)$$

$$T_{zc} = K_{mz} * \omega_o * H_{ym} * \phi - TD_z + T_w \quad (8)$$

$T_w$ being chosen so that $|T_{zc}| < T_{avail}$
where:
$T_{avail}$ = maximum torque that the actuator can provide about the Z axis (assumed here to be the same in both directions),
$T_{zc}$ = Z axis actuator command torque,
$H_{ym}, H_{zm}$ = measured momentum wheel Y and Z axis angular momentum components,
$T_w$ = momentum wheel Z axis angular momentum component command torque,
$\phi$ = measured roll angle,
$\psi$ = measured yaw angle,
$\omega_o$ = local angular speed of orbital rotation,
$TD_x, TD_z$ = estimated disturbing torques about the X and Z axes,
$K_{mx}, K_{mz}, K_w$ = transfer functions, possible just gains.

20. The combination as claimed in claim 12 wherein said first satellite fixed direction is parallel to said yaw axis, said second satellite fixed direction is parallel to said roll axis and said first and second additional wheel torque control signals are adapted to cause said momentum wheel system and said single direction continuously acting actuator system to generate torques of the form:

$$T_w = -\left( K_{mz} * H_{ym} * \phi + \frac{H_{zm} - H_{zr}}{\omega_o} \right) * \sin\alpha_w * K_w \quad (9)$$

$$T_{zc} = (K_{mz} * \omega_o * H_{ym} * \phi + H_{zm} - H_{zr}) * \cos\alpha_w + T_w \quad (10)$$

$$H_{zr} = \int T_w * dt \quad (11)$$

$T_w$ being chosen so that $|T_{zc}| < T_{avail}$ where:
$\alpha_w$ = WHECON angle between 5° and 85°,
$T_{avail}$ = maximum torque that the actuator can generate about the X axis,
$T_{zc}$ = actuator command torque about the X axis,
$H_{ym}, H_{zm}$ = measured momentum wheel Y and Z axis angular momentum components
$T_w$ = momentum wheel Z axis angular momentum component command torque,
$\phi$ = measured roll angle,
$\psi$ = measured yaw angle,
$\omega_o$ = local angular speed of orbital rotation,
$TD_x, TD_z$ = estimated disturbing torques about the X and Z axes,
$K_{mz}, K_{wz}$ = transfer functions, possibly just gains.

21. The combination as claimed in claim 12 wherein said variable component of said angular momentum is variable in direction in the roll/yaw plane.

22. The combination as claimed in claim 21 wherein said momentum wheel system comprises an inertia wheel having an axis mounted on a double pivot.

23. The combination as claimed in claim 21 wherein said first satellite fixed direction is parallel to said yaw axis, said second satellite fixed direction is parallel to said roll axis and said first and second additional wheel torque control signals are adapted to cause said momentum wheel system and said single direction continuously acting actuator system to generate torques of the form:

$$T_{wx} = \omega_o * (K_{mx} * H_{ym} * \psi + H_{zm}) + TD_x \quad (12)$$

$$T_{wz} = \left( -\frac{TD_x}{\omega_o} - H_{zm} \right) * K_{wz} \quad (13)$$

$$T_{zc} = \omega_o * (K_{zm} * H_{ym} * \phi + H_{xm}) - TD_z + T_{wz} \quad (14)$$

$T_{wz}$ being chosen so that $|T_{zc}| < T_{avail}$
where:
$T_{avail}$ = maximum torque that the actuator can provide,
$T_{zc}$ = actuator command torque,
$H_{xm}, H_{ym}, H_{zm}$ = measured momentum wheel X, Y and Z axis together momentum components,
$T_{wx}, T_{wz}$ = momentum wheel X and Z axis angular momentum component command torques,
$\phi$ = measured roll angle,
$\psi$ = measured yaw angle,
$\omega$ = local angular speed of orbital rotation,
$TD_x, TD_z$ = estimated disturbing torques about the X and Z axes,
$K_{mx}, K_{mz}, K_{wz}$ = transfer functions, possibly just gains.

24. The combination as claimed in claim 12 wherein said continuously acting actuator system is a magnetic system increasing with the local magnetic field.

25. The combination as claimed in claim 12 wherein said satellite is in a geosynchronous orbit inclined at less than 10°.

26. The combination as claimed in claim 25 wherein said orbit is a geostationary orbit.

* * * * *

UNITED STATES PATENT AND TRADEMARK OFFICE
CERTIFICATE OF CORRECTION

PATENT NO.  : 5,269,483
DATED       : December 14, 1993
INVENTOR(S) : Patrick Flament It is certified that error appears in the above-identified patent and that said Letters Patent is hereby corrected as shown below:

Column 1, after line 29, insert ---- aerodynamic effects (in the case of low orbits). ----.

Column 3, line 13, delete ---- s ----.

Column 3, line 40, delete "h" insert ---- have ----.

Column 6, line 5, delete "$\omega$" insert ---- $\omega_o$ ----.

Column 8, line 15, delete "y" insert ---- yaw ----.

Column 8, line 27, delete "$K_{zm}$" insert ---- $K_{mz}$ ----.

Column 8, line 34, after "=" insert ---- measured ----.

Column 9, line 32, delete "south" insert ---- South ----.

Column 11, line 17, delete "wit" insert ---- with ----.

Column 11, line 50, delete "H" first occurrence, insert ---- $H^o$ ----, same line, delete "$\psi$" insert ---- $\psi^o$ ----.

UNITED STATES PATENT AND TRADEMARK OFFICE
CERTIFICATE OF CORRECTION

PATENT NO. : 5,269,483

DATED : December 14, 1993

INVENTOR(S) : Patrick Flament

It is certified that error appears in the above-identified patent and that said Letters Patent is hereby corrected as shown below:

Column, 11, line 52, delete "$H$" first occurrence, insert ---- $\overset{\circ}{H}$ ----, same line, delete "$\phi$" insert ---- $\overset{\circ}{\phi}$ ----.

Column 11, line 61, delete "$H$" first and second occurrence, insert ---- $\overset{\circ}{H}$ ----.

Column 11, line 64, delete "$\phi$" insert ---- $\phi, \overset{\circ}{\phi}$ ----.

Column 11, line 65, delete "$\psi, \psi$" insert ---- $\psi, \overset{\circ}{\psi}$ ----.

Column 12, line 15, delete "$H$" both occurrences, insert ---- $\overset{\circ}{H}$ ----.

Column 12, line 39, delete "$H$" first occurrence, insert ---- $\overset{\circ}{H}$ ----.

Column 12, line 61, delete "$H$" insert ---- $\overset{\circ}{H}$ ----.

Column 14, line 17, delete "$H$" insert ---- $\overset{\circ}{H}$ ----.

Column 14, line 47, delete "= measured yaw angle," insert on next line ---- $\psi$ = measured yaw angle, ----.

UNITED STATES PATENT AND TRADEMARK OFFICE
CERTIFICATE OF CORRECTION

PATENT NO. : 5,269,483

DATED : December 14, 1993

INVENTOR(S) : Patrick Flament

It is certified that error appears in the above-identified patent and that said Letters Patent is hereby corrected as shown below:

Column 16, line 45, after "$Hym^*$" insert ---- $Hym^*\psi$ ----.

Column 16, line 51, after "$Tzc =$" insert ---- $\omega_0$ ----, same line delete "o" second occurrence, insert ---- $\phi$ ----.

Column 16, line 64, delete "$\omega$" insert ---- $\omega_0$ ----.

Column 18, line 23, delete "$Txc$" insert ---- $\dfrac{Txc}{\omega_0}$ ----.

Column 19, line 44, delete "$kzm$" insert ---- $Kmz$ ----.

Column 21, line 5, delete "$107o^{Txc}$" insert ---- $\dfrac{Txc}{\omega_0}$ ----.

Column 21, line 13, after "first" insert ---- satellite ----.

Column 21, line 17, delete "axle" insert ---- axis ----.

Column 21, line 60, delete "possible" insert ---- possibly ----.

Column 22, line 44, delete "$Kzm$" insert ---- $Kmz$ ----.

Column 22, line 52, delete "together" insert ---- angular ----.

Column 22, line 57, delete "$\omega$" insert ---- $\omega_0$ ----.

UNITED STATES PATENT AND TRADEMARK OFFICE
CERTIFICATE OF CORRECTION

PATENT NO. : 5,269,483
DATED : December 14, 1993
INVENTOR(S) : Patrick Flament

It is certified that error appears in the above-identified patent and that said Letters Patent is hereby corrected as shown below:

Column 22, line 62, delete "increasing" insert ---- interacting ----.

Signed and Sealed this

Twenty-fifth Day of October, 1994

Attest:

BRUCE LEHMAN

Attesting Officer    Commissioner of Patents and Trademarks